Inventors:
James Corwith
Wilbur H. Clendenin
Manfried L. Hoch
By John J. Kowalik
Atty.

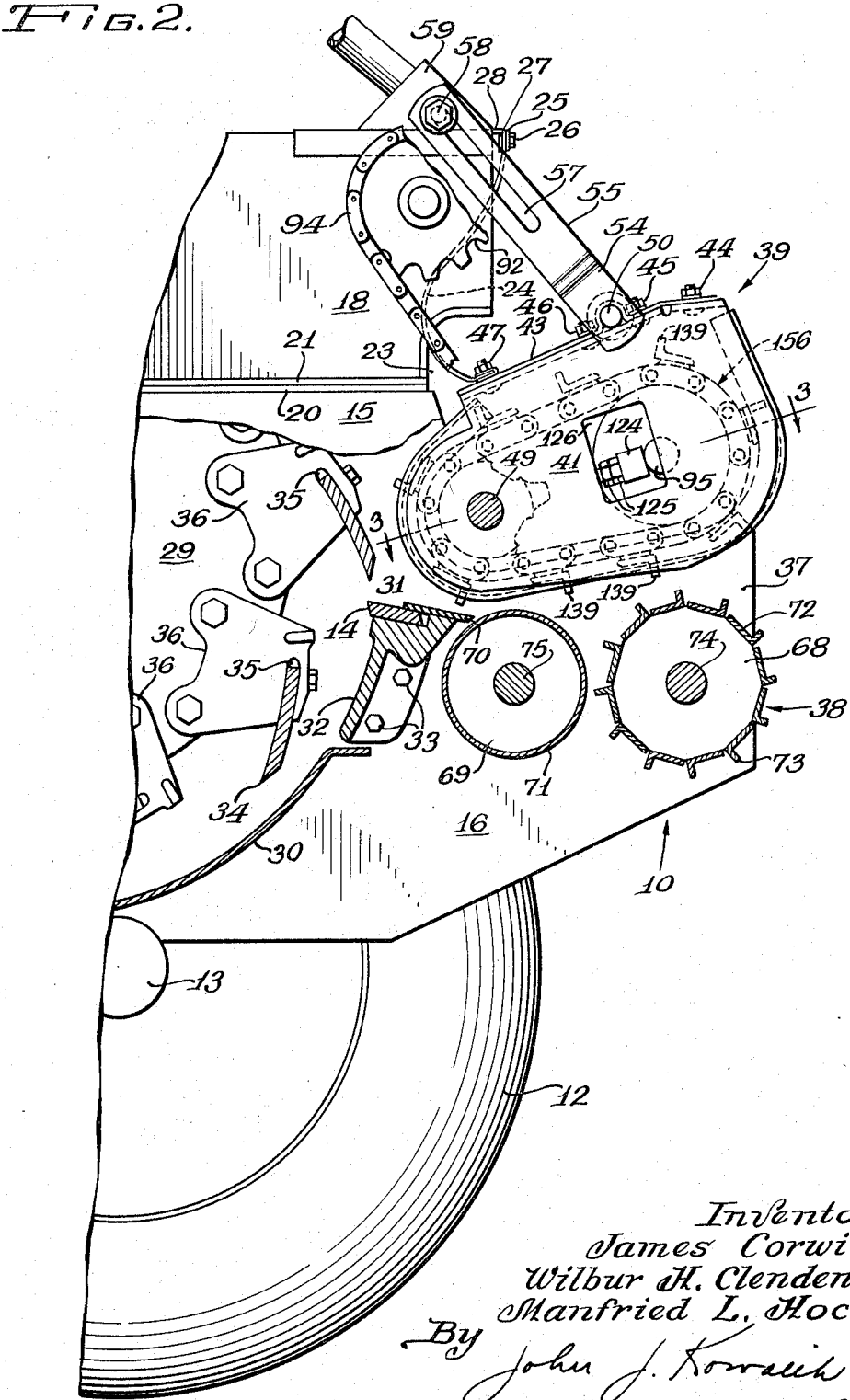

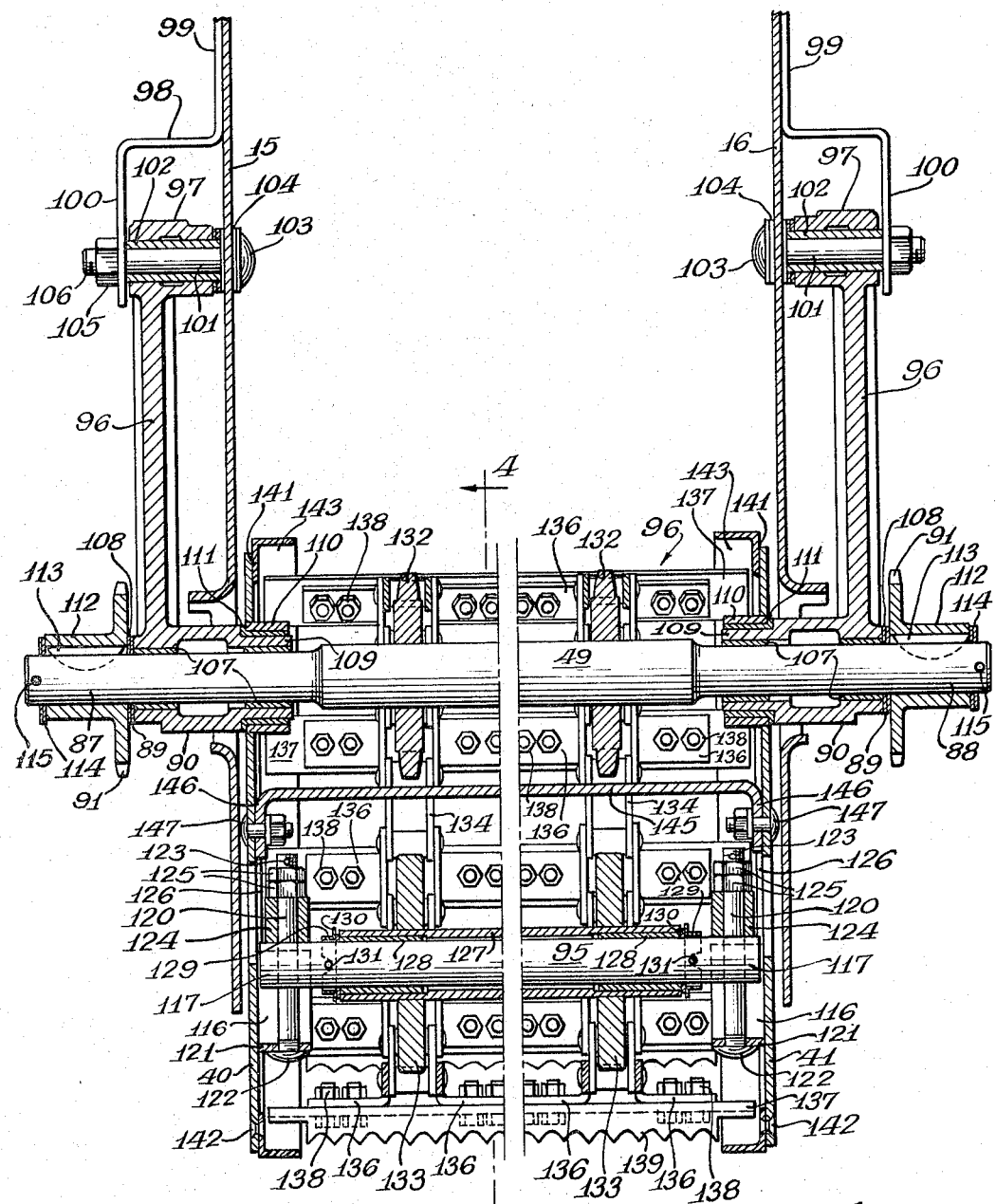

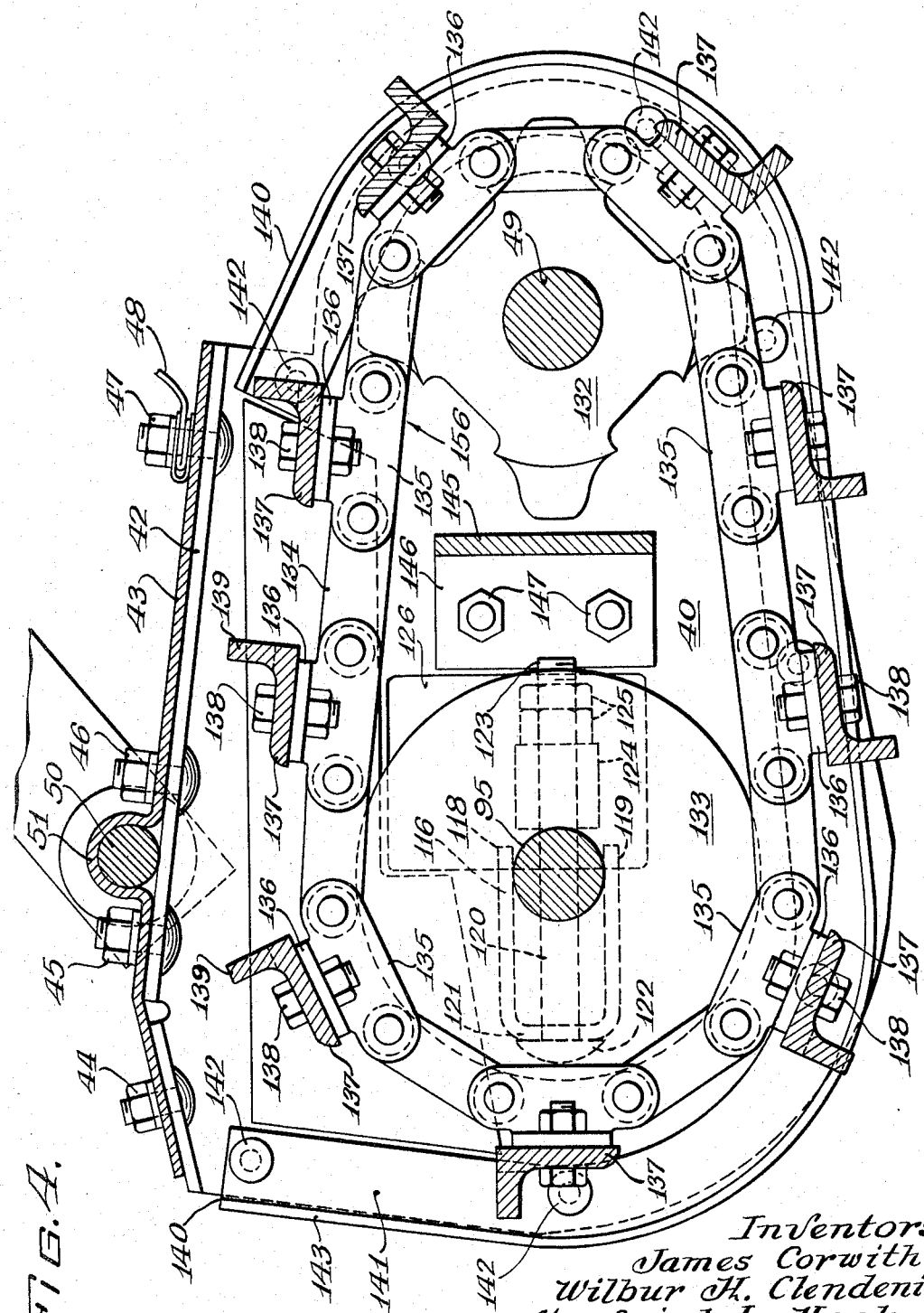

United States Patent Office 3,282,404
Patented Nov. 1, 1966

3,282,404
FEED APRON CONSTRUCTION
James Corwith, Bettendorf, Iowa, Wilbur H. Clendenin, Memphis, Tenn., and Manfried L. Hoch, Lockport, Ill., assignors to International Harvester Company, Chicago, Ill., a corporation of New Jersey
Filed Feb. 11, 1965, Ser. No. 431,850
5 Claims. (Cl. 198—167)

This invention relates to harvesting devices. Particularly it relates to feed apron construction in forage harvesters and the like. Specifically it relates to a guard for feed aprons and the like.

Conventionally, forage harvesters and the like comprise a gathering unit or mechanism which aggressively gathers crop in the path of movement of a harvester and delivers such gathered crop to a feeding mechanism. The feeding mechanism then conveys the gathered crop to a cutter head housing in which a rotatable cutter-carrying head is mounted for cutting, chopping or otherwise abscinding the thereto conveyed crop. Thereafter, the processed crop is removed from the cutter head housing through a discharge chute.

Conventionally, a feeding mechanism may be defined by upper and lower feed assemblies which rotate oppositely to each other to feed harvested crop from the forward end of the feed mechanism into an associated cutter head housing. An upper feed assembly comprises what is known as a feed apron, being a plurality of parallel endless sprocket driven chins which carry transversely extending tooth bearing crop engaging slats or bars. Because of the heavy duty performed by feed aprons, occasionally the chain of an apron may break and be fed into the cutter head housing, doing substantial, if not irreparable, damage. By providing means for holding or retaining the feed apron in the event of chain breakage, feeding of the apron into the cutter head housing can be obviated.

In accordance with an object of the instant invention, an improved feeding mechanism construction is provided.

An additional object of the instant invention is the provision of a novel feed apron guard which inexpensively and easily can be added to existing equipment.

A yet further object of the instant invention is the provision in a harvester having a feed apron of novel feed apron guard means adapted to preclude feeding of such apron, when broken, into other harvester parts.

Another problem which manifests itself in connection with employment of conventional forage harvesters is that elongated strands of vegetation tend to wrap about the ends of the slats which comprise the runs or conveyor components of a conventional feed apron. Thereby, movement of the upper feed mechanism may be impaired to a state in which movement becomes completely curtailed should entanglement become sufficiently heavy, whereby time will be necessarily lost to relieve the apron of the wound material strands.

It is a feature and an additional object of the instant invention that the feed apron guard which is provided be disposed and constructed to preclude winding about the ends of a feed apron of elongated strands of material normally delivered to a feeding mechanism.

It is a yet further object of the instant invention to provide a guard in the nature of a housing extension disposed about the ends of a feed apron in a forage harvester and the like which serves to retain the feed apron within the confines of its housing in the event a chain or other portion of said feed apron is broken, and simultaneously to cover the ends of the feed apron in a manner that will preclude elongated strands of harvested material from being wound about the ends of the feed apron.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 2 is an elevational view looking toward the left side of the device shown in FIG. 1, with portions cut away and parts shown in dotted lines for the purpose of illustration.

FIG. 3 is an enlarged horizontal sectional view of the feed mechanism taken substantially on the line 3—3 of FIG. 2 and looking in the direction of the arrows.

FIG. 4 is an enlarged vertical sectional view taken substantially on the line 4—4 of FIG. 3 and looking in the direction of the arrows.

Figure 1:
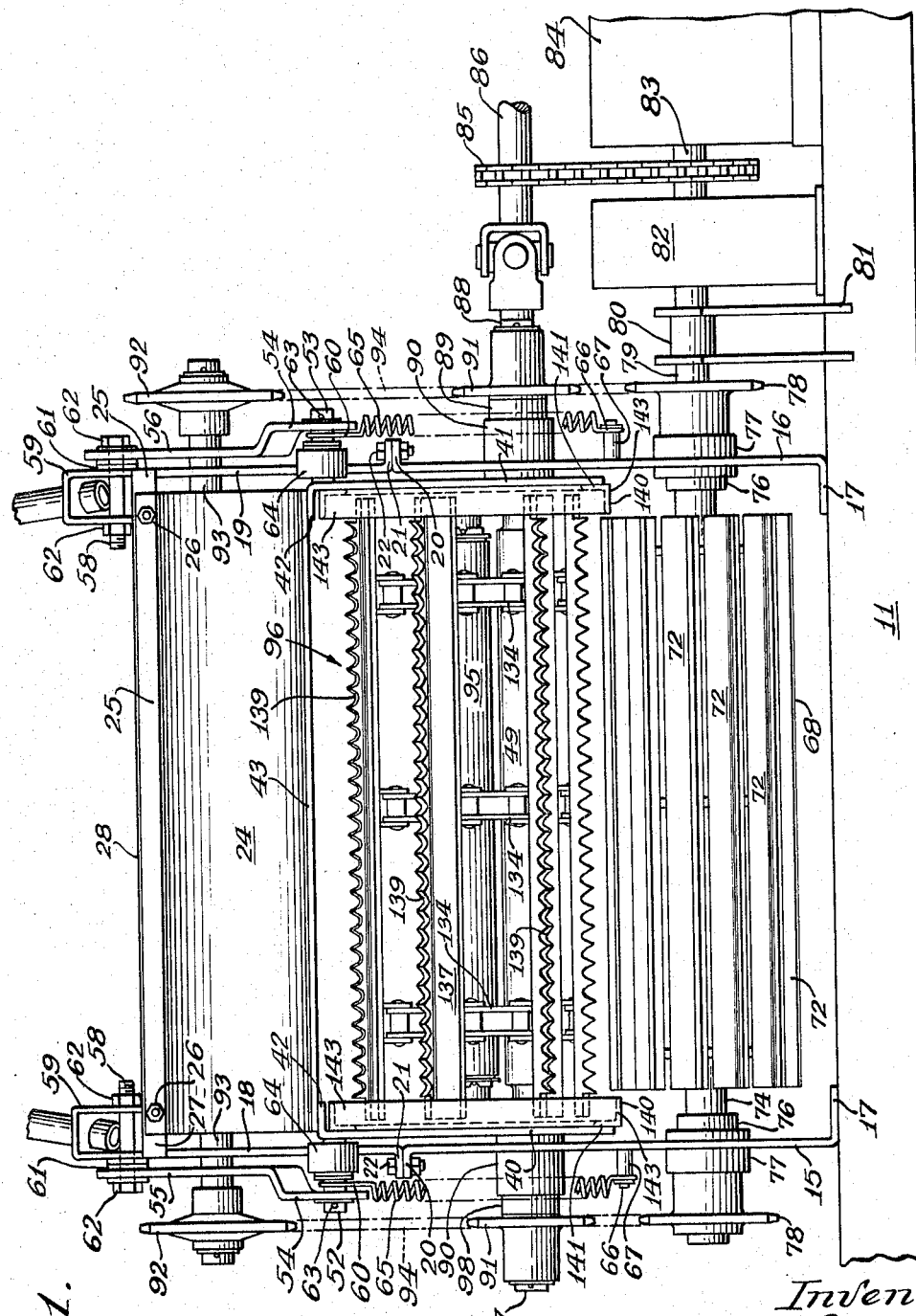
FIG. 1 is an elevational view of a harvesting device looking toward the front of a forage feeding mechanism embodying the instant invention.

Referring now more particularly to the drawings, there is shown a harvesting device 10 of the class generally referred to as a forage harvester, having a supporting chassis including frame member 11 which extends transversely of the harvester 10 and supports at the opposite end portions thereof a pair of spaced apart traction wheels 12, only one of which is shown in FIG. 2, and which are carried on axle means 13 journalled in a conventional fashion in the frame member 11.

The frame member 11 supports a lower left housing side plate 15 and a lower right housing side plate 16 which extend vertically and are disposed in parallel spaced apart relationship. Each of the side plates 15 and 16 has a foot or flange 17 which extends inwardly toward the other from the bottom of a respective of said side plates 15 and 16 and which is rigidly secured to the frame member 11 by any conventional means, as illustrated in FIG. 1. An upper left side housing plate 18 and an upper right side housing plate 19 extend upwardly from respective of the lower side plates 15 and 16 in the vertical planes thereof, as illustrated in FIG. 1. Each of the lower side housing plates 15 and 16 has an upper outwardly extending flange 20, and each of the upper side housing plates 18 and 19 has a lower cooperating flange 21, as illustrated in FIGS. 1 and 2. By means of suitable fasteners 22, flanges 20 and 21 of the left side plates 15 and 18 and of the right side plates 16 and 19 are rigidly secured together to provide the opposite side housing members of the harvester 10.

As illustrated in FIG. 2, the upper portion of the harvester body comprising the side plates 18 and 19 does not extend as far forwardly as the lower plates 15 and 16. Thereby, there is provided a somewhat right angular opening 23 at the front of the harvester housing. A flexible curtain 24 which is disposed transversely between the housing plates 18 and 19 is hung from the depending flange 27 of a cutter head housing cover 28 which is disposed across the tops of the housing side plates 18 and 19. By means of suitable fasteners 26, the upper end portion of the curtain 24 is secured between a transversely extending clamp bar 25 and the flange 27, as clearly illustrated in FIGS. 1 and 2.

A rotatably driven cutter head 29 is carried in the housing beneath the cover 28 within a housing portion limited by a curved lower wall 30, as illustrated in FIG. 2. The wall 30 defines an opening 31 extending transversely between the plates 15 and 16 and in which there is mounted a stationary blade holder 32 which is secured by means of suitable fasteners 33 to the opposite lower side plates 15 and 16. The stationary blade holder 32 rigidly supports an elongated transversely extending stationary blade 14 in operable disposition in the path of rotating knives or cutters 34 which are adjustably mounted in slots 35 of knife holders 36 carried on the cutter head 29, as illustrated in FIG. 2.

In that portion 37 of the front opening between the lower housing plates 15 and 16, there is mounted in feeding alignment with the opening 31 a crop feeding mechanism which includes an upper feed assembly generally designated 39 and a lower feed assembly generally designated 38. The upper feed assembly 39 is disposed within an upper feed housing comprising a pair of spaced apart vertical left and right feed housing side walls 40 and 41. Each of said side walls has an inwardly extending upper flange 42 which provides the means for securing thereto a feed housing cover 43. Cover 43 extends transversely across the top of said side walls, and its opposite side portions are secured to said flanges 42 by means of conventional fasteners such as nuts and bolts collectively identified by numerals 44, 45, 46 and 47, as illustrated in FIGS. 2 and 4.

The upper feed assembly 39, therefore, is seen to comprise the side housing walls 40 and 41 together with the cover 43, being suspended in opening portion 37 by reason of connection to the lower end portion 48 of the curtain 24 which is secured by the rearmost fasteners 47 to the cover 43, as illustrated in FIGS. 2 and 4. Inasmuch as the curtain 24 is fabricated of fabric or rubberized fabric which may be bent, as illustrated in FIG. 2, the upper feed assembly 39 is rockably adjustable about shaft 49 which provides a moveable axis of rotation for said upper feed assembly 39, as will become hereinafter more apparent.

Medial its front and rear ends, the cover 43 may be deformed or bent to provide a transversely extending tunnel 51 through which extends a rod, bar or shaft 50 which is anchored at opposite sides between the cover 43 and the flanges 42, as illustrated in FIG. 4. The opposite end portions 52 and 53 of said shaft 50 are projected through the lower end portions 54 of a pair of opposed arms 55 and 56 which are disposed laterally from upper side housing plates 18 and 19, respectively, as clearly illustrated in FIG. 1.

As illustrated in FIG. 2, in which only the arm 55 is shown, the arms 55 and 56 which are substantially identical, are elongated and angularly disposed sloping upwardly as they extend rearwardly. Each of the arms 55 and 56 has an elongated slot 57 which extends longitudinally of its respective arm and through which there is projected a stud 58. Each stud 58 extends through the lower end portion of a bracket 59 which is rigidly mounted on a respective side of cover 28, as illustrated in FIGS. 1 and 2. Washers or the like 61 space the arms 55 and 56 from their respective brackets 59, and opposed fastening means 62 mounted on opposite ends of each stud 58 hold the upper end portion of each of the arms 55 and 56 on its respective stud 58, their lower end portions being secured on respective of shaft extensions 52 and 53 by means of cotter pins 63 or the like.

By reason of the foregoing, it is appreciated that the upper feed mechanism 39 may be rockably adjusted with the movement guided by the studs 58 in the slots 57. The arms 55, 56 are provided with rollers 64 which engage and side upon the upper edges of the flanges 21 to prevent interference of the feed assembly with the attaching unit (not shown). To counter operational upwardly directed torque, that is, rotational force counterclockwise with respect to FIG. 2, and thereby draw the upper feed assembly 39 toward the lower feed mechanism 38 for operational alignment to the extent permitted by the slots 57, a pair of tension springs 65 are provided. Tension springs 65 extend substantially vertically, having upper hooked ends 60 anchored on respective end portions 52 and 53 and also having lower hooked ends 66 suitably secured on pins 67 which extend outwardly from the plates 15 and 16 below and in vertically spaced relationship to the shaft 50.

As clearly illustrated in FIG. 2, the lower feed assembly 38 comprises a forward feed roll 68 and a rear feed roll 69 disposed medially of and in operative feeding alignment with said forward feed roll and a lip 70 serving as a guide to the cutter head 29. Lip 70 may be carried by the fixed blade holder 32 in transverse disposition relative to the housing plates 15 and 16. In the embodiment herein illustrated, the feed rolls 68 and 69 are substantially horizontally aligned, as illustrated in FIG. 2. The outer skin 71 of the rear feed roll 69 may be smooth surfaced, while the forward feed roll 68 comprises a plurality of peripheral adjoining slats 72 the longitudinal axes of which extend transversely of said roll 68 about its entire circumference and which have angular outwardly extending transverse feeding lugs 73. The forward driven shaft 74 of the front feed roller 68, as well as the driven shaft 75 of the rear feed roller 69, extends transversely of the housing plates 15 and 16. While this is clearly shown in FIG. 1 with respect to the shaft 74, it is obscured with respect to the shaft 75 by reason of the position of the view.

In FIG. 1 it is seen that one end and a medial portion of the shaft 74 are projected through opposed bearings 76 which are carried in bearing housings 77 mounted on opposite lower housing side plates 15 and 16, respectively. A sprocket wheel assembly including a sprocket wheel 78 is secured on opposed parts of the shaft 74 laterally of each of side housing plates 15 and 16. The shaft 74 serves for power input to the feed assemblies 38 and 39.

The shaft 49 drives the upper feed assembly 39. It extends transversely of the harvester 10 and its opposite end portions 87 and 88 are projected through feed assembly side walls 40 and 41, and the lower housing plates 15 and 16, being rotatably supported in bearings 89 which are carried in housings 90 mounted in or carried by side plates 15 and 16, respectively. A sprocket wheel assembly including a sprocket wheel 91 is mounted an each shaft portion 87 and 88.

An idler assembly including a sprocket wheel 92 is rotatably mounted on a stub shaft 93 carried in each of the upper side housing plates 18 and 19, respectively, as illustrated in FIG. 1. The sprocket wheels 78, 91 and 92, and a sprocket wheel (not shown), mounted on shaft 75 and which are disposed on each side of the device are driven by an endless sprocket link chain 94, as illustrated in FIGS. 1 and 2.

As illustrated in FIGS. 2 and 3, the drive shaft 49 is disposed in a rear end portion of the housing comprising the upper feed assembly 39. An idler shaft 95 is disposed in the forward end portion of the housing comprising the upper feed assembly 39 parallel to and spaced forwardly from drive shaft 49. The drive shaft 49 operates a feed apron generally designated by the numeral 156 and which is adapted to travel in a clockwise direction with respect to FIG. 2 to feed crop through the orifice 31 in cooperation with rollers 68 and 69 which are adapted to rotate counterclockwise with respect to FIG. 2.

The bearing housing 90 for each of the end portions 87 and 88 of the drive shaft 49 comprises the forward end portion of a transversely apertured arm 96 which extends longitudinally of harvester 10. The rear end portion 97 of each arm 96 is mounted on a respective of the lower side housing plates 15 and 16 by means of a bracket 98 the rear mounting portion 99 of which is secured by any suitable means to its respective of the side housing plates 15 and 16.

An outwardly disposed and forwardly extended integral portion 100 of each bracket 98 and which is spaced laterally from its respective of the side housing plates 15 and 16 is apertured to provide passage for a bolt 101, as illustrated in FIGURE 3. Each bolt 101 extends through a bushing 102 mounted in a respective end portion 97 of arm 96 and each such bolt 101 is secured by reason of its head 103 which bears against a washer and the like 104 which is disposed between each head 103 and the inner surface of a respective of the side plates 15 and 16, with each head 103 being drawn tightly by means of a nut 105 mounted on the threaded end portion 106 of its respective bolt 101.

As illustrated in FIG. 3, each bearing member 89 comprises a pair of laterally spaced apart annular bushings 107 mounted in the bearing housing comprising the forward end portion 90 of each arm and through which a respective of the end portions 87 and 88 is projected. The bearings 89 also comprise washer means 108 extending radially about the shaft portions 87 and 88 between their respective sprocket wheels 91 and their associated bearing housings or arm portions 90. Additionally, each arm portion or bearing housing 90 has an inwardly extending annular extension 109 which is projected through an inwardly extending flange 110, the outer end portion of each of which is secured to a respective of the feed assembly side walls 40 and 41. Disposed between each flange 110 and an associated arm extension 109 is a bushing 111.

Having further reference to FIG. 3, it is seen that each sprocket wheel 91 has an axially extending hub 112 which is keyed as at 113 to a respective of the shaft end portions 87 and 88. Each sprocket wheel 91 is further secured from lateral displacement by washer means 114 mounted about each of the shaft end portions 87 and 88 and retained by a cotter pin 115, as illustrated in FIG. 3.

Now, having reference to the feed apron shaft 95, it is seen that it is rigidly secured between the walls 40 and 41 by reason of a U-shaped bracket or stand 116 which is secured against the inner surface of each wall 40 and 41. Between the upper leg 118 and lower leg 119 of each bracket 116, an opposite end portion 117 of the shaft 95 is inwardly and outwardly adjustably mounted to adjust tension of apron 156. The adjustable mounting is effectuated by means of a bolt 120 which is projected rearwardly through the base 121 between legs 118 and 119 of each bracket 116. Inward movement of each bolt 120 is limited by engagement of bolt head 122 with its respective bracket base 121. The shaft of each bolt 120 extends rearwardly from its base 121 through a respective end portion 117 of the shaft 95, and provides a threaded extension 123 about which a collar or spacer 124 is adjustably secured by opposed lock nuts 125 to there provide for adjustably positioning the shaft 95 and thereby adjustably tension feed apron 156, the disposition of which will be subsequently more fully described. To provide easy access to the adjusting nuts 125 to adjust the tension of the feed apron with ease, window openings 126 are provided in the feed apron housing side walls 40 and 41, respectively, as illustrated in FIGS. 2, 3 and 4.

While the foregoing arrangement prohibits independent rotation of the shaft 95, a sleeve 127, as illustrated in FIG. 3, is journalled about a medial portion of the shaft 95 with rotation thereof facilitated by opposed bushings 128 which are mounted in spaced apart relationship within opposite end portions of the sleeve 127. Lateral displacement of the sleeve 127 is precluded by reason of a nut or ring construction 129 which is mounted adjacent each end of the sleeve 127. Each nut or ring 129 is spaced from a respective end of sleeve 127 by a washer 130 and is held from lateral displacement by a cotter pin 131 extended through its respective portion of the shaft 95.

The upper feed apron 156 comprises a plurality of sprocket wheels 132 which are rigidly secured to and spaced axially of the shaft 49, whereby, as said shaft rotates, the sprocket wheels 132 are carried therewith. A plurality of sprocket wheels 133 are rigidly secured to sleeve 127 along which said sprocket wheels 133 are spaced axially. Each of said sprocket wheels 133 is operably aligned and associated with a sprocket wheel 132 and they comprise together with the other associated pairs of sprocket wheels 132 and 133 the means for driving the feed apron 156 which is characterized by a plurality of endless link chains 134 each of which is mounted in conventional driving relationship with an associated pair of sprocket wheels 132 and 133. Thereby there is provided a plurality of endless driven sprocket chains 134 which are spaced from each other axially of the shafts 49 and 95.

Because of the heft of the feed assembly 156, it may be desirable to support the side walls 40 and 41. For that purpose a vertical brace 145 may be employed, as illustrated in FIGS. 3 and 4. Said brace 145 extends transversely of housing side walls 40 and 41 and has its opposite right angular fastening end portions 146 secured to the opposite side walls 40 and 41 by means of fasteners 147.

As illustrated in the drawings, selected links 135, only some of which have been numbered in FIG. 4, are equally spaced longitudinally of their respective chains 134 in an endless path. Links 135 have laterally extending flanges 136, only some of which have been numbered in FIG. 4. Corresponding links 135, having oppositely extending flanges 136, are found in transversely aligned positions in all of the chains 134, as illustrated at the bottom of FIG. 3. The flanges 136 provide the means by which a plurality of transversely extending slats 137 are rigidly secured to the chains 134 by means of suitable fasteners which may be opposed lock nuts 138, and only some of which have been numbered in the drawings.

Each of the transversely extending slats 137 has a normally extending flange 139, only some of which have been numbered in the drawings to obviate crowding. As illustrated, each of the flanges 139 has a serrated or erosed edge providing a plurality of teeth extending longitudinally of its respective slat 137. Thereby, there is provided a plurality of transversely extending feed members disposed in substantially equally spaced relationship from adjacent thereof to provide a feeding belt the direction of travel of which is clockwise with respect to FIG. 2 and counterclockwise with respect to FIG. 4.

As illustrated in FIGS. 2 and 4, when viewed from the side, the housing for the upper feed assembly 39 is auricular in shape, that is, much like an external ear. To obviate feeding of broken feed aprons 156 into the orifice 31, and also to preclude choking of the feed apron by reason of tangling of long strands around the side ends of the slats 137, a pair of elongated right angular guards 140 bent or curved in the shape of external ears are provided. Each of the guards 140 has an outer or lateral portion or flat 141 which is disposed against the inner surface of a peripheral portion of a respective of the upper feed housing walls 40 and 41 against which the inner flats 141 are secured by means of suitable fasteners such as rivets 142 or the like which are suitably spaced longitudinally of the guard 140, as clearly illustrated in FIG. 4. Additionally, each of the guards has an integral inwardly extending flat or flange 143, each of which, as clearly illustrated in FIGS. 1, 3 and 4, extends toward the other thereof inwardly beyond the opposite end portions of the slats 137 which are overlapped by said flanges 143.

As illustrated in FIG. 4, the guard 140 extends along the back, bottom and front of the housing defining the upper feed assembly 39, the top thereof being covered by cover 43 heretofore defined. The shape of the guards 140 in the instant embodiment essentially follows the peripheral contours of the feed housing walls 40 and 41, whereby the shape of each of the guards 140 is auricular. However, it is not intended that the shape of the guards 140 be so limited, as other curved paths may be found to be suitable. What is of importance is that the guards be disposed about the opposite ends of the conveyor slats 137 comprising the feed belt, to the end that in the event of breaking of a chain 134, for example, none of apron assembly 156 will be fed into the housing for the cutter head 29, and the apron 156 assembly will be retained between cover 43, walls 40 and 41 and flanges 143.

Of additional significance with respect to the instant invention is the facility with which conventional equipment can be modified to provide the feed aprons with guards. In accordance with the instant teaching, conventionally designed equipment need be provided with only a pair of curved guard members or rails 140 which are to be riveted, fastened or otherwise secured along the peripheral portions of their feed apron housing members to the end that the opposite end portions of the slats 137 a re enclosed from below and front and back.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a harvesting machine having a body with a crop processing casing, a lower feed assembly mounted on said body, an upper feed assembly disposed above said lower feed assembly in delivering relationship therewith to said casing, said upper feed assembly comprising a structure including a pair of laterally spaced side walls presenting confronting faces, means mounting said upper feed assembly from said body for vertical movement with respect to said lower feed assembly, said upper feed assembly comprising a conveyor having a plurality of feed members extending transversely of said side walls and having end portions terminating adjacent to respective faces, guards mounted on said side walls and extending beyond the respective faces toward each other in overlapping relation to the respective end portions of said feed members, and said guards encompassing opposite ends of said conveyor, whereby in the event of breakage of said conveyor it is retained by said guards from being fed into said casing.

2. The invention according to claim 1 and said guards each having a first flange connected to the respective side wall and disposed between the related ends of said feed members and the adjacent said face of the side wall and having another flange overlapping the ends of said feed members.

3. The invention according to claim 1 and said conveyor having curved ends and said guards curved about said ends and presenting external crop-engaging surfaces and said guards further having portions extending along the lower portion of said conveyor.

4. The invention according to claim 1 and said feed members having intermediate crop-engaging portions between said guards projecting outwardly of said guards.

5. The invention according to claim 4 and said intermediate crop-engaging portions being formed with outwardly pointed teeth.

References Cited by the Examiner
UNITED STATES PATENTS

| | | | |
|---|---|---|---|
| 792,549 | 6/1905 | Penrose | 198—137 |
| 1,289,004 | 12/1918 | Rosenthal | 146—118 |

EVON C. BLUNK, *Primary Examiner.*

RICHARD E. AEGERTER, *Examiner.*